(12) United States Patent
Ojard

(10) Patent No.: US 7,103,121 B2
(45) Date of Patent: Sep. 5, 2006

(54) FREQUENCY DIVERSE SINGLE CARRIER MODULATION FOR ROBUST COMMUNICATION OVER IN-PREMISES WIRING

(75) Inventor: Eric J. Ojard, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/122,149

(22) Filed: May 4, 2005

(65) Prior Publication Data

US 2005/0207510 A1  Sep. 22, 2005

Related U.S. Application Data

(63) Continuation of application No. 09/971,407, filed on Oct. 5, 2001, now Pat. No. 6,907,086, which is a continuation of application No. 09/169,552, filed on Oct. 9, 1998, now Pat. No. 6,327,311.

(51) Int. Cl.
*H04B 7/02* (2006.01)
*H04B 1/10* (2006.01)
*H03D 3/00* (2006.01)

(52) U.S. Cl. .................................. 375/347; 375/350

(58) Field of Classification Search ........ 375/140–143, 375/150, 152, 316, 322–337, 347, 350; 329/300–302, 329/304–308
See application file for complete search history.

(56) References Cited

U.S. PATENT DOCUMENTS

| | | | | |
|---|---|---|---|---|
| 5,495,203 A | * | 2/1996 | Harp et al. | 329/306 |
| 5,619,536 A | * | 4/1997 | Gourgue | 375/316 |
| 6,215,828 B1 | * | 4/2001 | Signell et al. | 375/316 |
| 6,611,565 B1 | * | 8/2003 | Bada et al. | 375/295 |
| 6,639,939 B1 | * | 10/2003 | Naden et al. | 375/140 |

* cited by examiner

*Primary Examiner*—Don N. Vo
(74) *Attorney, Agent, or Firm*—Garlick, Harrison & Markison LLP; Bruce Garlick

(57) ABSTRACT

The present invention provides a frequency-diverse single-carrier modulation scheme that extends the usable SNR range of severely distorted channels. This scheme is advantageous for applications in which when the SNR is low and the transmitted spectrum contains unusable regions (e.g., spectral nulls due to radio-frequency interference ingress or egress). In one embodiment, the symbol baud rate is selected in order that unusable portions of the frequency response of the transmission channel are mapped onto usable portions of the frequency response of the transmission channel.

12 Claims, 14 Drawing Sheets

POWER SPECTRUM OF COMPLEX BASEBAND DATA SIGNAL

POWER SPECTRUM OF COMPLEX LOW-PASS FILTERED SIGNAL

RIGHT-HANDED POWER SPECTRUM OF REAL FREQUENCY-DIVERSE SIGNAL

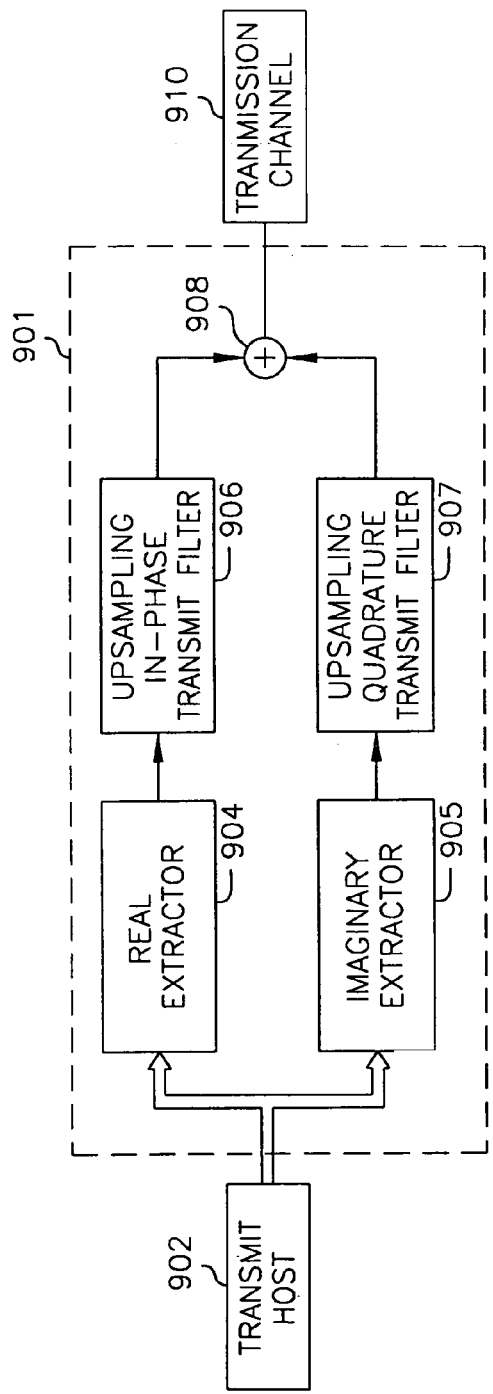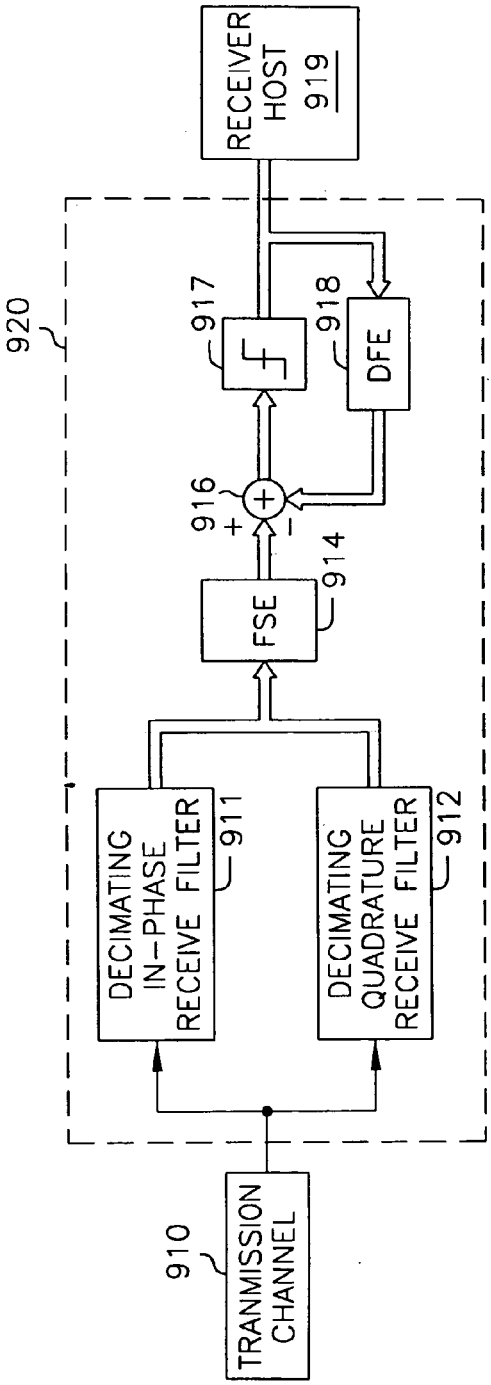

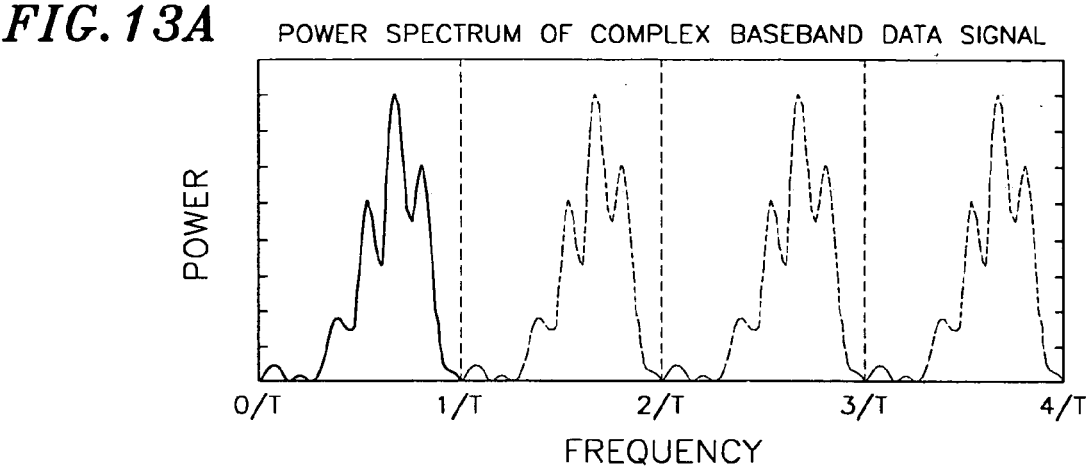
FIG.13A  POWER SPECTRUM OF COMPLEX BASEBAND DATA SIGNAL
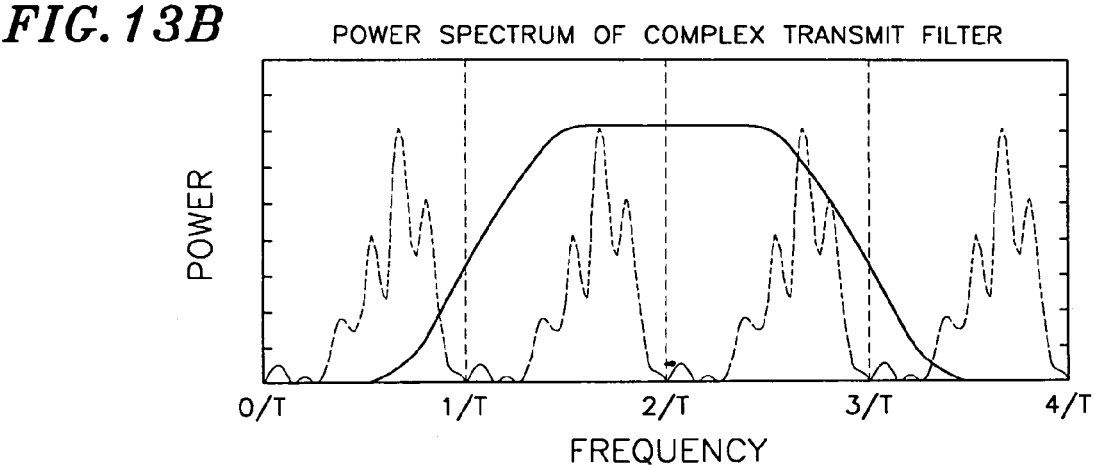
FIG.13B  POWER SPECTRUM OF COMPLEX TRANSMIT FILTER
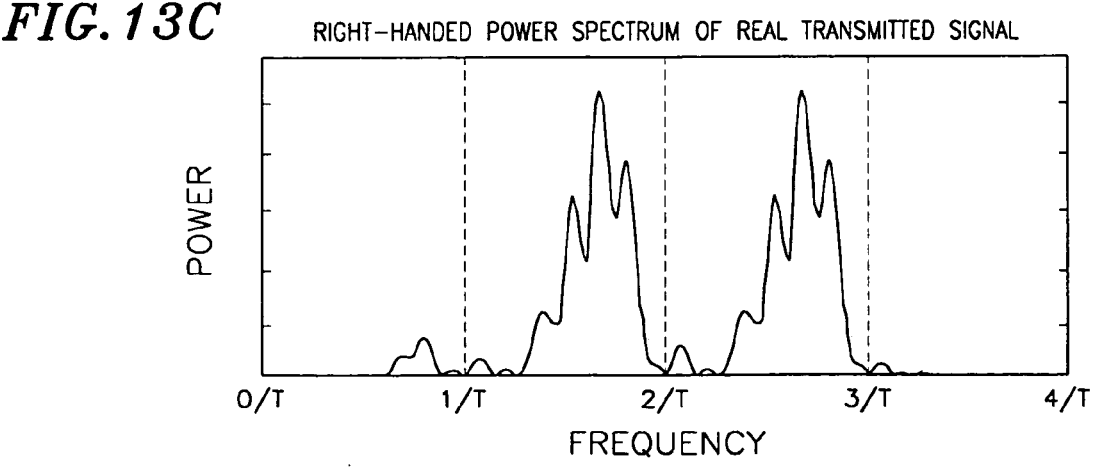
FIG.13C  RIGHT-HANDED POWER SPECTRUM OF REAL TRANSMITTED SIGNAL

FREQUENCY DIVERSE SINGLE CARRIER MODULATION FOR ROBUST COMMUNICATION OVER IN-PREMISES WIRING

CROSS REFERENCES TO RELATED APPLICATIONS

This application is a continuation of U.S. patent application Ser. No. 09/971,407, filed Oct. 5, 2001, now issued as U.S. Pat. No. 6,907,086, which is a continuation of U.S. patent application Ser. No. 09/169,552 filed Oct. 9, 1998, now issued as U.S. Pat. No. 6,327,311, both of which are incorporated herein in their entirety.

BACKGROUND

1. Field of the Invention

The present invention relates to high-speed data transmission over unconditioned metallic wiring and specifically to an efficient modulation technique for robust data transmission over severely distorted channels.

2. Background

Characteristics of Wiring in Homes and Buildings

In many instances, it is desirable to install communications networks in homes and businesses using the pre-existing wiring. Utilizing the pre-existing wiring allows the homeowner or business owner to network the building using the existing copper infrastructure without a major investment in the installation of optical fiber or other network transmission media. However, the network also needs to be capable of transmitting data at high data rates.

The pre-existing wiring (i.e., telephone wiring and power wiring) of most homes and other buildings is not of uniform type and may consist of 24 gauge twisted quad wiring, unshielded flat pair, or other miscellaneous types of wiring. This wiring can produce severely distorted transmission channels. FIG. 1 shows an example of a network 100 using existing 24 gauge twisted copper, such as the existing telephone lines in a home or business. Network 100 includes a main line 101 and trunk lines 102, 103 and 104, which are each coupled at one end to main line 101. Main line 101 includes a signal source 105 at one end and a receiver terminator 106 at the opposite end. Receiver terminator 106 provides main line 101 with a 100 Ohm termination. In FIG. 1, main line 101 is 360 feet long. Trunk line 102 is 80 feet long and is coupled to main line 101 at a point 170 feet from signal source 105. Trunk line 103 is 25 feet long and is coupled to main line 101 at a point 90 feet from receiver terminator 106. Trunk line 104 is 25 feet long and is coupled to main line 101 at a point 40 feet from receiver terminator 106. Trunk lines 103 and 104 each have open, unterminated ends (i.e., infinite termination) opposite the end that is coupled to main line 101. Trunk line 102 includes a 100 ohm terminator at an end opposite the end of trunk line 102 that is coupled to main line 101. Other examples of networks can include any number of terminated, unterminated or improperly terminated lines.

FIG. 2 shows the frequency response of the transmission channel between signal source 105 and receiver terminator 106 of network 100 shown in FIG. 1. The unterminated trunk lines, trunk lines 103 and 104, cause a deep null in the spectrum of the frequency response. Other networks may have multiple spectral nulls or a differently shaped frequency response.

Other sources of spectral nulls or distortions in the frequency response of a transmission channel include filters to reject interference from HAM radio bands. FIG. 3 shows the combined response of transmit and receive filters in a passband modulated transceiver, including RFI suppression filters, for a transmission band of between 4 MHz and 10 MHz. The spectral null in the center of the spectrum suppresses the 40 meter HAM band.

As long as the signal-to-noise ratio of a received signal is sufficiently high, channel distortion can be corrected by equalization. Near-optimal throughput can be achieved by using a decision-feedback equalizer or equivalent structure. (See G. D. Forney, Jr., and M. V. Eyuboglu, *Combined Equalization and Coding Using Precoding*, IEEE COMM. MAG., vol. 29, no. 12, pp. 25–34, December 1991.) An ideal decision-feedback equalizer (DFE) or equivalent precoding structure, in combination with a fractionally-spaced feed-forward equalizer (FSE), can correct the distortion from a transmission channel in an optimal manner, enabling the achievable throughput to approach the theoretical channel capacity arbitrarily closely with the use of sufficiently complex coding schemes (See J. M. Cioffi, et al., *MMSE Decision-Feedback Equalizers and Coding—Part I: Equalization Results*, IEEE TRANS COMM., vol. 43, no. 10, pp. 2582–2594, October 1995; J. M. Cioffi, et al., *MMSE Decision-Feedback Equalizers and Coding—Part II: Coding Results*, IEEE TRANS COMM., Vol. 43, no. 10, p. 2595–2604, October 1995).

However, when the transmission band of the channel contains deep spectral nulls and the signal-to-noise ratio is low, a large part of the transmission band may become unusable. This can easily happen when the transmitted signal power is limited and the spectrum of the transmitted signal is constrained within a narrow bandwidth to allow spectral compatibility with other signals on the transmission channel. In cases in which the power spectral density (PSD) is constrained or in which the SNR is limited by self-crosstalk, the frequency-dependent SNR is fixed and the SNR cannot be improved by increasing the transmit PSD. FIG. 4 shows a combined response of the transmit and receive filters of FIG. 3 and the transmission channel between signal source 105 and receiver termination 106 of FIG. 1. In FIG. 4, much of the spectrum is unusable because it is near or below the noise floor of −120 dBm/Hz.

In such cases where the signal-to-noise ratio is relatively low and the channel contains large spectral nulls, the achievable throughput for traditional single-carrier modulation using integral bits per symbol may be zero. For example, a single-carrier transceiver operating with a baud rate of 4 Mhz, a 15 dB gap (a measure of the difference between the theoretical channel capacity and the achievable channel capacity) and integer bits per symbol on a channel having the power spectral density shown in FIG. 4 has an achievable capacity of zero bits per symbol. Therefore, traditional single-carrier modulation fails. Single carrier modulation schemes are further discussed below. Theoretical capacity, achievable capacity, and the gap between them are further discussed below.

The problem of transmitting data through noisy channels having large spectral nulls is often solved by using transceivers that utilize either multicarrier modulation or frequency diverse modulation schemes. Multicarrier modulation or frequency diverse modulation schemes may provide acceptable throughput in such cases, but these schemes have additional implementation complexity and other practical disadvantages in comparison with single-carrier modulation transceivers.

Multi-Carrier Modulation

Multi-carrier modulation is a popular solution in some applications. The most common type of multi-carrier modulation is Discrete Multi-Tone (DMT) modulation. See J. A. Bingham, et al., *Multicarrier Modulation for Data Transmission: An Idea Whose Time Has Come*, IEEE COMM. MAG., May 1990, 5–14; I. Kalet, *The Multitone Channel*, IEEE TRANS. COMM., Vol. 37, No. 2, February 1989. On typical subscriber-loop channels, for example, DMT modulation generally achieves the same throughput as single-carrier modulation, assuming equivalent coding methods and properly optimized parameters. On severely distorted channels with large unusable spectral regions, however, DMT modulation transceivers may achieve better throughput than single-carrier modulation transceivers, especially when the capacity gap (see discussion of channel capacity below) is large.

DMT modulation transceivers have some disadvantages, however, as compared to single carrier modulation transceivers. A first disadvantage is that DMT modulation requires that the transmitter be informed of the transmission channel response. Therefore, DMT requires significant amounts of information flow from the receiver to the transmitter as well as data flow from the transmitter to the receiver. In addition, DMT modulation has a much higher peak-to-average ratio than single-carrier modulation, requiring the use of more expensive analog-to-digital and digital-to-analog converters with greater dynamic ranges than is required in single-carrier systems. DMT modulation also has less natural immunity to narrowband interference than single-carrier modulation. In addition, DMT modulation has a more complex transceiver structure compared to single-carrier modulation. These factors make DMT unattractive for many applications.

Frequency-Diversity

A frequency-diverse system is a system in which the transmitter of the transceiver modulates a signal with more than one carrier frequency, providing spectral redundancy in the transmitted signal (See T. RAPPAPORT, WIRELESS COMMUNICATIONS, PRINCIPLES AND PRACTICE, section 6.10.5 (1996)). The receiver of the frequency-diverse system then selects and demodulates the best frequency band or some combination of the different bands based on the characteristics of the transmission channel as measured at the receiver. Typically, the quality of the different frequency bands is unknown or time-varying because the network response is unknown or time-varying. A traditional frequency-diverse transceiver typically consists of two or more single-carrier transceivers in parallel. Although the transmitter does not require knowledge of the channel characteristics, the receiver must include additional logic to select the best frequency band. Additionally, the receiver requires a separate receiver structure for each modulation frequency, adding complexity to the receiver.

An example of a frequency-diverse QAM transceiver is shown in FIGS. 5A and 5B. FIG. 5A shows a transmitter 501 that transmits signals having multiple carrier frequencies $\omega_1$ through $\omega_N$. A host system 502 sends a symbol stream to transmitter 501. The symbol stream is split into its real and imaginary parts and filtered in transmit filter 506. Often, the input symbol stream is also upsampled and zerofilled in transmit filter 506. FIG. 6A shows an example of a power spectrum of a short sequence of data symbols transmitted at a baud rate of 1/T (i.e., T is the symbol period). In FIG. 6A, the solid line represents the base-band transmission spectrum and the dotted line is the repeated transmission spectrum that results from upsampling and inserting null samples between adjacent symbols. FIG. 6B shows the power spectrum of the complex output of a low-pass filter. In a QAM transceiver, for example, transmit filter 506 includes low-pass filters that yield the power spectrum shown in FIG. 6B given the signal power spectrum shown in FIG. 6A. In FIG. 6B, the spectral response of transmit filter 506 is shown by the dotted line. The spectral response of transmit filter 506 shown in FIG. 6B is of a 50% excess-bandwidth square-root raised cosine pulse.

In FIG. 5A, the real portion of the symbol stream is mixed with the functions $\cos(\omega_1 t)$ through $\cos(\omega_N t)$ in mixers 508-1 through 508-N, respectively. The imaginary part of the sample stream is mixed with the functions $\sin(\omega_1 t)$ through $\sin(\omega_N t)$ in mixers 509-1 through 509-N, respectively. The output signals from mixers 508-1 through 508-N and 509-1 through 509-N are added in adder 510 and the sum is coupled to transmission channel 511. FIG. 6C shows the right-handed power spectrum of the real signal obtained by modulating the signal power spectrum shown in FIG. 6B by the carrier frequencies 1.0/T, 3.5/T and 6.0/T.

Transmitter 501, therefore, transmits each symbol of the symbol stream from host 502 onto transmission channel 511 N times using N different carrier frequencies. One or more frequency bands may be unusable, but in a well-designed system, it's unlikely that all bands would be unusable. The receiver can read the symbol from any of the N bands into which it is transmitted. Typically, the receiver chooses a particular band of transmission from which to receive signals based on an error analysis of the symbol stream received at the receiver.

FIG. 5B shows a receiver 512 for receiving the signals transmitted from transmitter 501 of FIG. 5A. Receiver 512 includes N individual receivers 513-1 through 513-N, one for each of the N modulation frequencies $\omega_1$ through $\omega_N$, respectively. The signal from transmission channel 511 is received into each of receivers 513-1 through 513-N. The signal is mixed with the function $\cos(\omega_1 t)$ through $\cos(\omega_N t)$ in mixers 514-1 through 514-N, respectively, and filtered in receive filters 516-1 through 516-N, respectively. The signal from transmission channel 511 is also mixed with the function $\sin(\omega_1 t)$ through $\sin(\omega_N t)$ in mixers 515-1 through 515-N, respectively, and filtered in receive filters 516-1 through 516-N, respectively. The output signals from receive filters 516-1 through 516-N combined into a real and imaginary portion and received by equalization/decider 517-1 through 517-N, respectively. The output signals from equalization/decider 517-1 through 517-N are received by receive host 518. Receiver host 518 receives the output signals from equalizer deciders 517-1 through 517-N and, based on a statistical analysis of the symbol stream, chooses a best symbol stream from the usable frequency bands. Other receiver hosts may take a weighted average of the output sample streams of equalizer deciders 517-1 through 517-N. The weighted average sample stream, then, is presented to a single equalizer structure that may include a decision feedback equalizer and a slicer.

The multi-tone solution and the frequency diversity solution, although capable of sending data through lossy transmission channels with large gaps in the available bandwidth, require the use of multiple modulators and demodulators. This adds complexity to the transceiver and increases cost, making it unattractive for some applications. There is a need for a single-carrier transceiver structure for transmitting signals through channels having large spectral nulls.

SUMMARY

In accordance with the present invention, a single-carrier modulation transceiver that achieves robust operation over transmission channels with a low signal-to-noise ratio (SNR) and large unusable spectral regions is presented. The transceiver uses a baud rate of transmission of less than half the spectral bandwidth of the transmitted signal. This introduces spectral redundancy, the amount of which increases as the baud rate decreases. A receiver includes a fractionally spaced equalizer that processes the full bandwidth of the signal. The benefits of frequency diversity are realized while the benefits of a single-carrier transceiver structure are retained.

Embodiments of the invention include a single carrier transmitter and a single carrier receiver. The single carrier receiver includes a fractionally spaced equalizer that processes the full bandwidth of the transmission channel. The transceiver is capable of reducing the symbol baud rate through the fractionally spaced equalizer in order to increase the usable SNR range of the system. The symbol baud rate and the transmit and receive filters are chosen so that the baud rate is less than or equal to half of the spectral bandwidth of the transmitted signal, as that term is defined below.

Embodiments of the invention can use any symbol modulation scheme, including CAP, QAM, PSK and APSK. Embodiments of the invention are further discussed below in relation to the following figures.

BRIEF DESCRIPTION OF THE FIGURES

FIG. 9A shows a block diagram of a CAP transmitter.
FIG. 9B shows a block diagram of a CAP receiver.

FIGS. 13A through 13C show power spectra of a short complex data burst as it is transmitted through a CAP or QAM transceiver system according to the present invention.

In the figures, components that have the same or similar functions have identical identifiers.

DETAILED DESCRIPTION OF THE INVENTION

Figure 1:
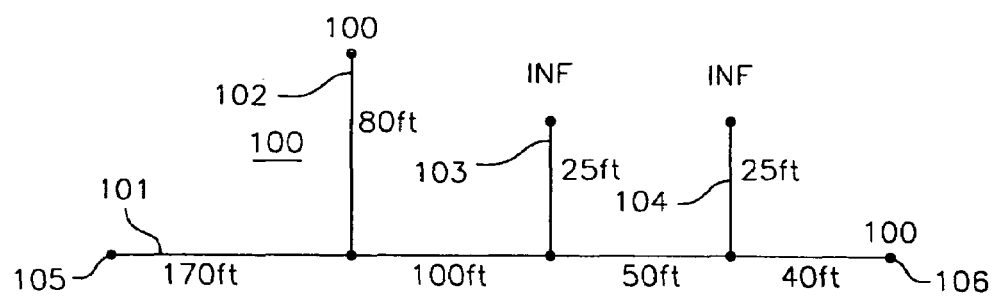
FIG. 1 shows typical pre-existing wiring used as a data communications network.
Figure 2:
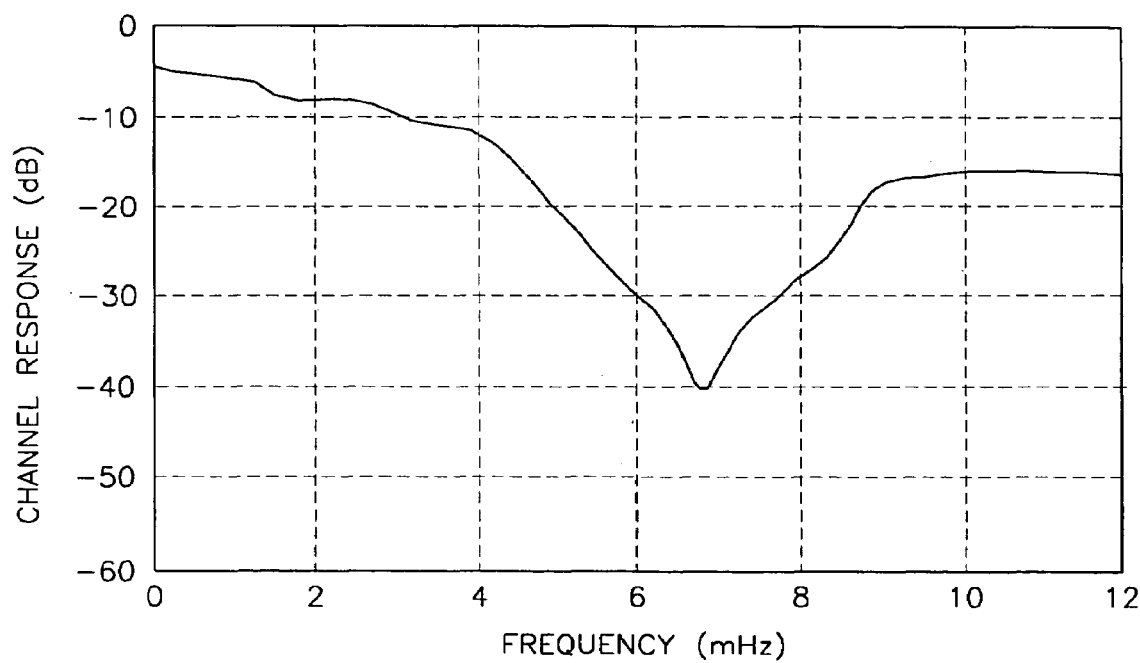
FIG. 2 shows the network frequency response of the network shown in FIG. 1.
Figure 7:
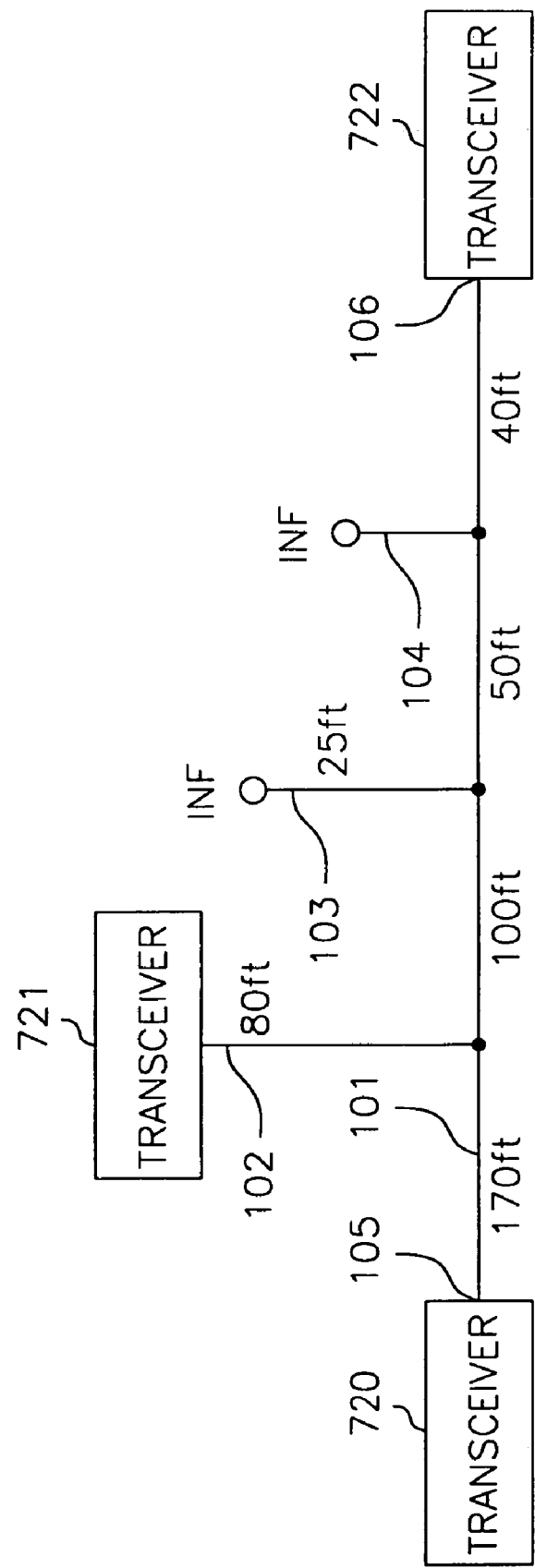
FIG. 7 shows a distributed network of transceivers according to the present invention.

FIG. 7 shows network 100 of FIG. 1 having transceivers 720, 721 and 722 according to the present invention. Transceiver 720 is coupled to the network at signal source 105, transceiver 721 is coupled to the network at the end of trunk line 102 away from main line 101, and transceiver 722 is coupled to the network at receiver terminator 106. In FIG. 7, any of transceivers 720, 721 and 722 can transmit data to any or all of the other transceivers 720, 721 and 722. In general, a network consists of multiple coupled transceivers. The transmission channel between any pair of transceivers depends on the signal path between the pair of transceivers. A packet-switched system for transmitting data between multiple transceivers in a network is described in U.S. patent application Ser. No. 09/037,357, "Off-line Broadband Network Interface", Eric Ojard et al., filed Mar. 9, 1998, and assigned to the same assignee as the present disclosure, herein incorporated by reference in its entirety.

Figure 8:
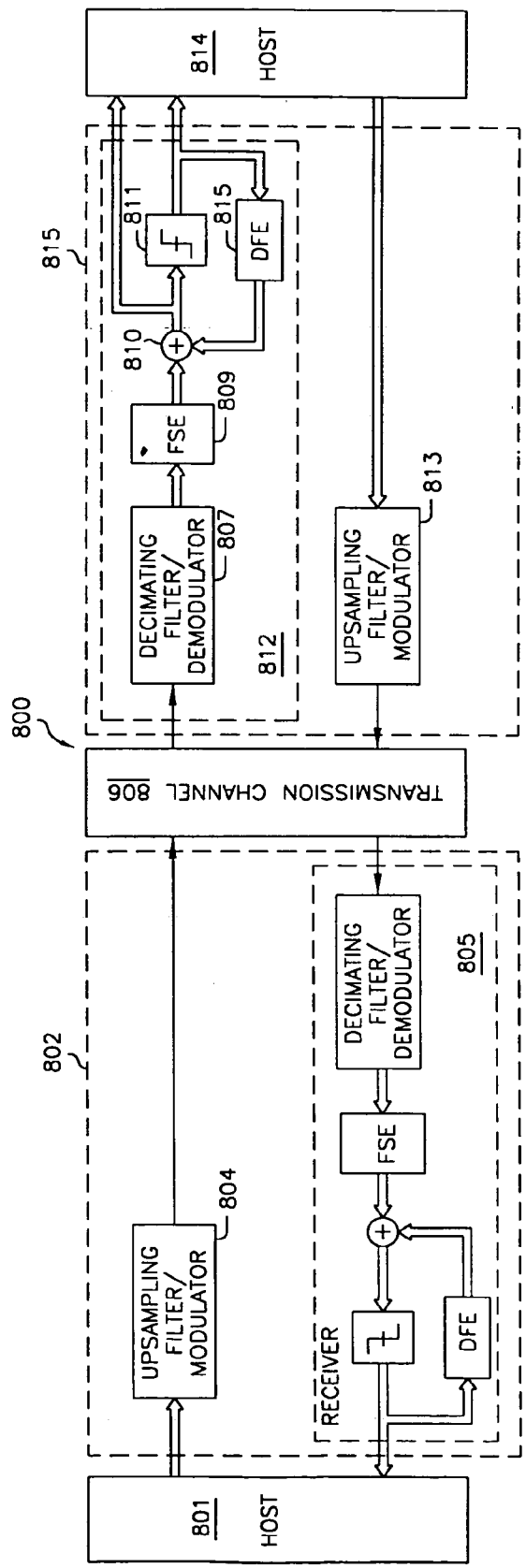
FIG. 8 shows a transceiver system according to the present invention.

FIG. 8 shows a transceiver system 800 according to the present invention. Transceiver system 800 represents any pair of transceivers in a network such as the one shown in FIG. 7. A host 801 is coupled to a single carrier transmitter 804 and a receiver 805. Transmitter 804 and receiver 805 are each coupled to transmission channel 806. Transmission channel 806 represents the channel in the network that couples transceiver 802 with transceiver 815. A host 814 is coupled to receiver 812 and transmitter 813, each of which are also coupled to transmission channel 806. Transceiver 802 includes upsampling filter/modulator 804. Receiver 812 includes decimating filter demodulator 807, fractionally spaced equalizer 809, and slicer 811. Hosts 801 and 814 are any devices, such as computer systems, that send and receive data through transceiver system 800.

Figure 10A:
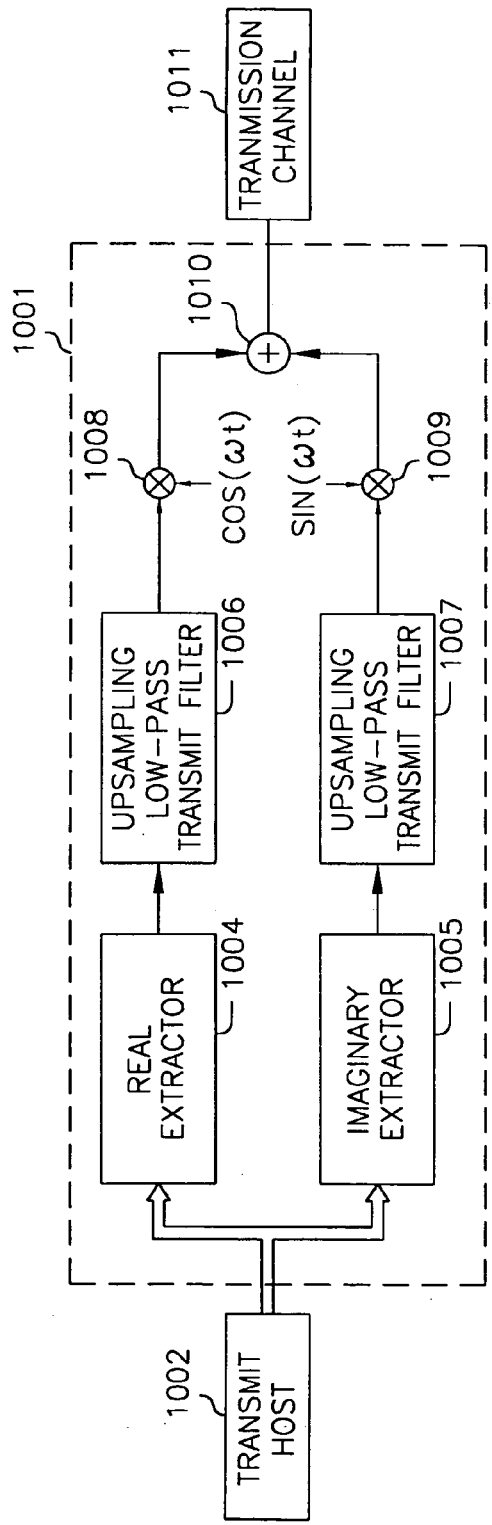
FIG. 10A shows a block diagram of a QAM transmitter.

Upsampling filter/modulator 804 receives a symbol stream from host 801, inserts k-1 null symbols between consecutive symbols of the symbol stream, and transmits the sample stream onto transmission channel 806. The parameter k represents the ratio between the output sampling rate to the input sampling rate of upsampling filter/modulator 804. Upsampling filter/modulator 804 includes filtering, modulation of the output sample stream, and may include preprocessing of the sample stream (precoding) to remove intersymbol interference and other effects of transmission channel 806 on the signals. Transceiver 802 may use one of many modulation schemes in which to encode symbols, including quadrature amplitude modulation (QAM), Carrierless Amplitude-Phase Modulation (CAP), Phase Shift Keying (PSK) and Amplitude Phase Shift Keying (APSK). Transceiver 802 may also utilize other modulation schemes. An embodiment of filter/modulator 804 appropriate for CAP modulation is shown in FIG. 9A (see filter/modulator 901) and an embodiment of filter/modulator 804 appropriate for QAM modulation is shown in FIG. 10A (see filter/modulator 1001).

Figure 10B:
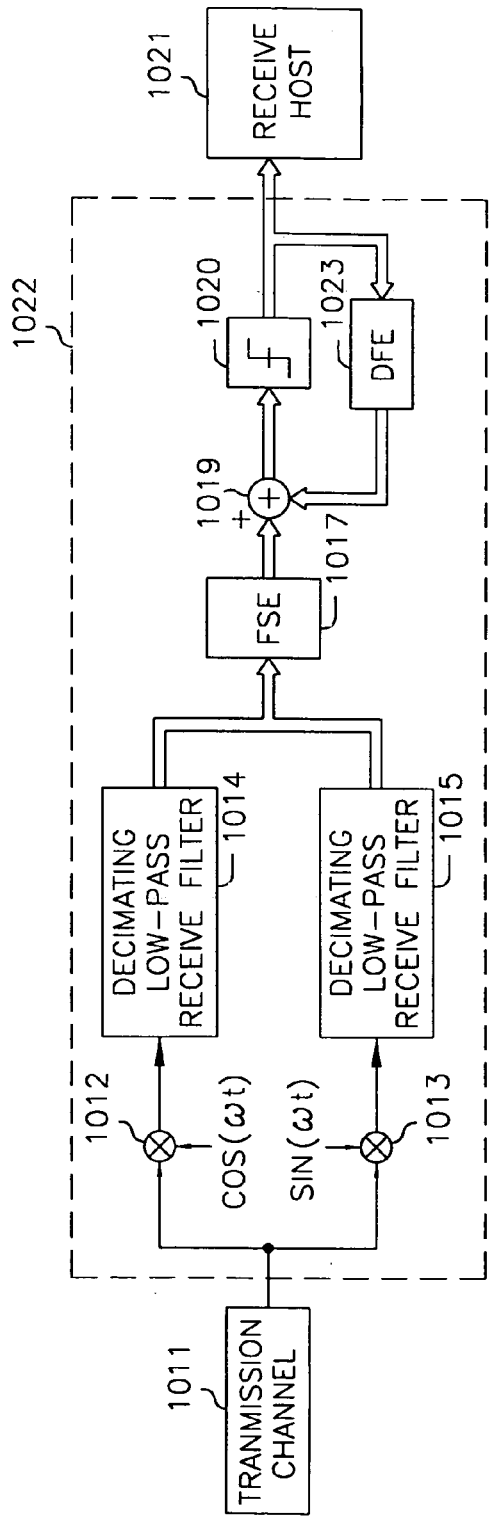
FIG. 10B shows a block diagram of a QAM receiver.

Decimating filter/demodulator 807 (FIG. 8) receives a sample stream from transmission channel 806. The sample stream received from transmission channel 806 is distorted with intersymbol interference due to the response of transmission channel 806. An embodiment of decimating filter/demodulator 807 appropriate for use with CAP modulation schemes is shown in FIG. 9B (filters 911 and 912) and an embodiment of decimating filter/demodulator 807 appropriate for use with QAM modulation schemes is shown in FIG. 10B (mixers 1012 and 1013 and filters 1014 and 1015). Decimating filter/demodulator 807 produces one (1) output sample for every k/L samples received. The ratio of the input sampling rate to the output sampling rate for decimating filter/demodulator 807, therefore, is k/L. In some embodiments, the input sampling rate of decimating filter/demodulator 807 differs from the output sampling rate of upsampling filter/modulator 802, in which case the ratio of the input sampling rate to the output sampling rate for decimating filter/demodulator 807 will differ from k/L.

Fractionally spaced equalizer (FSE) 809 equalizes the sample stream from decimating filter/demodulator 807. FSE 809 may be a linear time-invariant (LTI) finite-impulse-response (FIR) filter, although other structures may be used, including infinite-impulse response (IIR) filters and adaptive filters. FSE 809 produces one (1) output sample for every L input samples.

The sample stream, which now includes samples corresponding to the symbols transmitted by transceiver 802, are received in slicer 811. Slicer 811 may include further equalization structures, such as a symbol spaced decision feedback equalizer (DFE), and outputs a digitized symbol stream corresponding to a best-guess symbol stream based on the input signals received from transmission channel 806. In FIG. 8, the output samples from FSE 809 are received by adder 810, which subtracts the output sample stream for decision feedback equalizer (DFE) 815. DFE 815 receives the output symbols from slicer 811 and outputs samples that compensate the output samples from FSE 809 for intersymbol interference.

Host 814 inputs the symbol stream from slicer 811. In some embodiments of the invention, host 814 determines the applicability of the baud rate for transmission channel 806 based on an error analysis of the symbol sequence. In some embodiments, host 814 receives the sample stream that is input to slicer 811 in order to implement an error analysis. For example, receive host 814 can compute the mean-squared error (MSE) based on the difference between the input samples to slicer 811 (soft decisions) and the output symbols from slicer 811 (hard decisions). The MSE is then compared to a threshold value in order to determine whether or not the current baud rate is appropriate. Host 814 may then transmit a control signal to host 801 instructing it to change the baud rate. Other methods of determining the suitability of a baud rate (or adaptively choosing a baud rate) are also possible, such as measuring a bit error rate or frame error rate, or estimating the SNR based on a noise floor estimate and a channel estimate. In some embodiments, host 814 may test multiple baud rates in order to choose a baud rate that maximizes the net throughput (i.e., the product of the baud rate and the achievable bits per baud). Upsampling filter/modulator 813 and receiver 805 can have the same structures as upsampling filter/modulator 804 and receiver 812, respectively, although other structures can be used.

Figure 16:
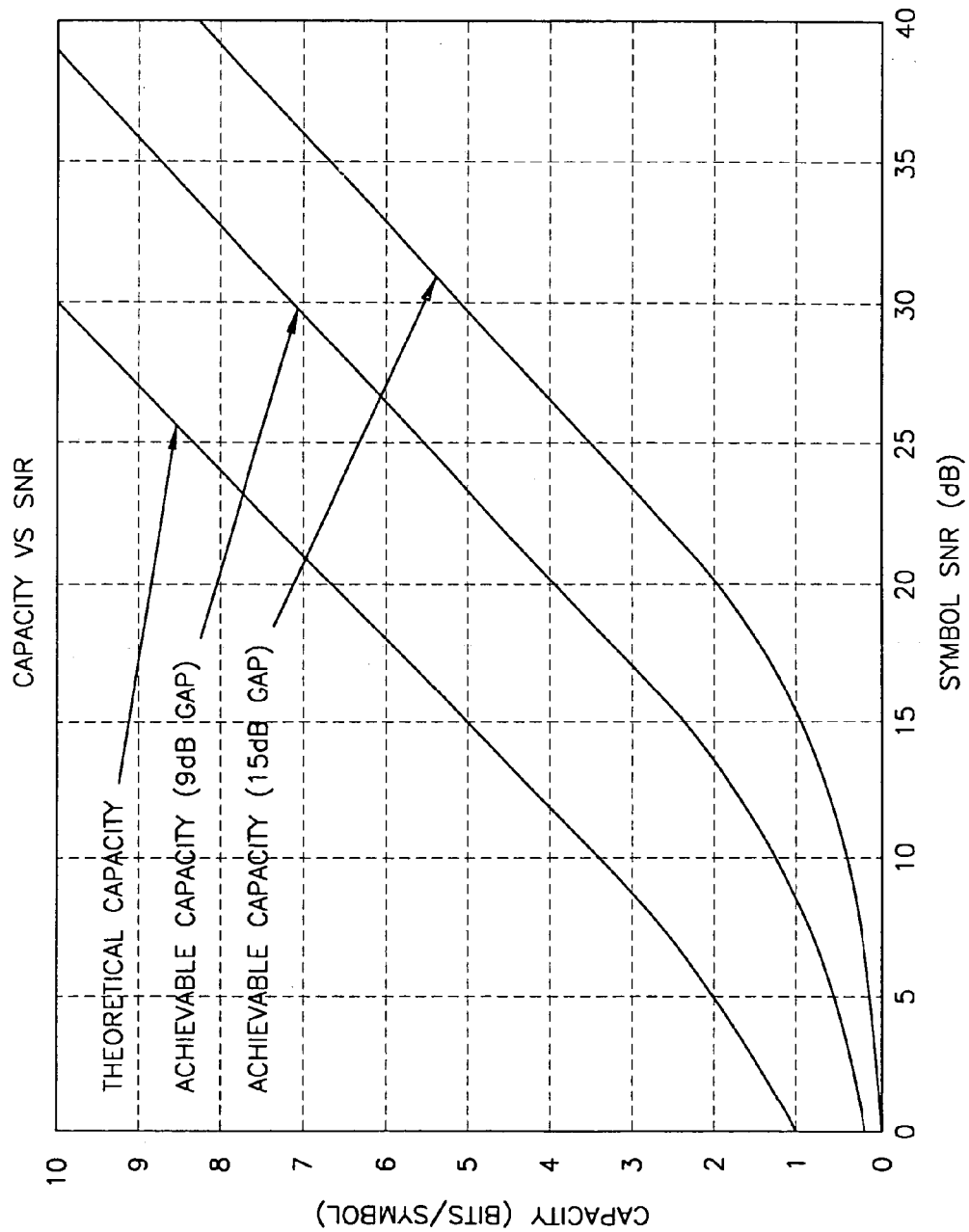
FIG. 16 shows the achievable channel capacity versus SNR and theoretical channel capacity versus SNR.

The achievable capacity of transmission channel 806 depends on the baud rate chosen by host 814. The theoretical channel capacity of transmission channel 806 is the theoretically maximum bit rate that can be transmitted through transmission channel 806. In real systems, there is a gap (measured in dB) between the achievable capacity of a channel and the theoretical capacity. A calculation of the theoretical capacity and the achievable capacity of a transceiver system is provided below. FIG. 16 shows a graph of the theoretical channel capacity versus SNR, the achievable channel capacity with a 9 dB gap, and the achievable channel capacity with a 15 dB gap versus SNR.

Passband Single-Carrier Modulation

According to the present invention transceivers, such as transceiver 800 (FIG. 8) is a single-carrier modulation transceiver. Passband single-carrier modulation schemes are attractive schemes for many transceiver applications due to their simplicity and flexibility. Passband systems are systems that do not include spectral components at or near D.C. (0 Hz) in the transmitted signal. Passband modulation is often needed because of poor transmission characteristics near D.C. or because the low-frequency spectrum is being used for something else (for example, to carry voice-band signals). The most common forms of passband single carrier modulation schemes are Carrierless Amplitude-Phase (CAP) modulation and Quadrature Amplitude Modulation (QAM). In this disclosure, single carrier modulation includes Carrierless Amplitude Phase modulation, which may be thought of as a single-carrier modulation scheme with a carrier frequency of zero, in order to distinguish CAP modulation from multi-carrier modulation schemes. Other varieties of single-carrier modulation schemes include Phase Shift Keying (PSK) and Amplitude Phase Shift Keying (APSK) schemes. The varieties of modulation schemes are differentiated by constellation type. The constellation refers to a plot, in the complex phase, of the symbols that constitute the symbol alphabet of the modulation scheme. Typically, CAP and QAM refer to symbol constellations that fall on a square grid, PSK constellations fall on a circle of constant magnitude, and APSK constellations fall on a non-uniform grid. All of the modulation schemes transmit a complex symbol sequence at a constant symbol baud rate.

Other modulation schemes will have different constellations. However, all of the modulation schemes can utilize the same transceiver structure. The respective receivers for QAM, PSK and APSK differ only in the decision device (slicer) used to interpret the received sample stream and the symbol alphabet used in the input symbol stream of the transmitter. CAP and QAM modulation schemes differ only in the mixers used to multiply the real and complex components of each symbol by a modulation signal in the QAM modulation scheme and in the response of the transmit filters.

FIG. 9A shows an example of a CAP transmitter 901. A host system 902 sends a symbol stream to transmitter 901. Each symbol in the symbol stream represents a unit of data (for example, a number of bits) and is dependent on the symbol alphabet, or modulation scheme, that is used for the transmission of data. For example, a 16-point CAP constellation encodes 4 bits of data per symbol. There are many other symbol alphabet schemes that can be used to transmit data. In general, a symbol represents a number of bits of data and includes a real and an imaginary part (i.e., a symbol A is a+bj, where a is the real portion and b is the imaginary portion of the symbol).

Each symbol in the symbol stream outputted by transmit host 902 is separated into its real and imaginary parts in real extractor 904 and imaginary extractor 905, respectively. The real portion of the sample stream is received by upsampling in-phase transmit filter 906. The imaginary portion of the symbol stream is received in upsampling quadrature transmit filter 907. Upsampling in-phase transmit filter 906 and upsampling quadrature transmit filter 907 are band-pass filters arranged to have the same magnitude response and to operate 90° out of phase with respect to one another. The pass band of filters 906 and 907 can be conventionally chosen. Filters 906 and 907 define the output power spectrum of transmitter 901.

Upsampling in-phase transmit filter 906 and upsampling quadrature transmit filter 907 also insert k-1 null samples between incoming symbols of the received symbol stream. The value of k is the ratio of the sampling rate to the symbol (baud) rate. A typical single-carrier system might have k=4, but k depends on other system parameters. In general, k is chosen so that the sampling rate is greater than the Nyquist frequency. The combined symbols with intermixed null samples is referred to as a sample stream.

The output signal from upsampling quadrature transmit filter 907 is subtracted from the output signal from upsampling in-phase transmit filter 906 in adder 908 and is then transmitted to transmission channel 910. Transmission channel 910 may take a variety of forms, but in many business and homes metallic wiring is used. A transceiver transmission channel 10 according to the present invention can use the pre-existing household wiring. Transmission channel 10, along with transmitter filters 906 and 907 and filters in the receiver, introduces significant distortion into the sample stream from transmitter 901, as was discussed above. This distortion is typically corrected in the receiver. In some systems, transmitter 901 includes preceding of the sample stream in order to counter the effects of the distortion.

FIG. 9B shows a CAP receiver 920. Signals from transmission channel 910 are received into decimating in-phase receive filter 911 and decimating quadrature receive filter 912. Decimating in-phase receive filter 911 is arranged to receive the real portion of the sample stream from transmission channel 910 and quadrature receive filter 912 is arranged to receive the imaginary portion of the sample stream from transmission channel 910. Decimating in-phase receive filter 911 and decimating quadrature receive filter 912 produce one (1) output sample for every k/L input samples. The ratio of the sampling rate of decimating in-phase receive filter 911 and decimating quadrature receive filter 912 to the output sampling rate, therefore, is k/L.

The combined real and imaginary parts of the sample stream, i.e. the output signals from decimating in-phase receive filter 911 and decimating quadrature receive filter 912, is received in fractionally spaced equalizer (FSE) 914. FSE 914 is a linear equalizer designed to compensate for channel distortion and intersymbol interference caused by transmission channel 910 and the transmit and receive filters. Fractionally spaced equalizer 914 produces one output sample for every L input samples. The parameter L, then, is the ratio of the input sampling rate to the symbol baud rate at FSE 614, where L>1. In a typical system, L may be set to 2, although other values could be used, including non-integers. Using a fractionally-spaced equalizer enables filtering of the band-edges, enabling optimal matched-filter performance. (See E. LEE AND D. MESSERCHMITT, DIGITAL COMMUNICATIONS, 331 (1988)). The output samples from FSE 914 often are further equalized with a decision feedback equalizer (DFE) 918. DFE 918 receives the output symbols from slicer 917 and outputs a sample stream that is subtracted from the output samples from FSE 914 in adder 916. The output samples from adder 916 are received by slicer 917, which determines the output symbol stream based on the input samples. Slicer 917 interprets the sample stream in accordance with the modulation scheme utilized by the transceiver.

A QAM transceiver operates in a similar fashion to a CAP transceiver. The equalization is arranged to correct a substantially similar distortion as in the CAP transceiver shown in FIGS. 9A and 9B and therefore the equalizer structures are substantially the same. The major difference between a CAP transceiver and a QAM transceiver is that in the QAM transceiver there is a modulation by a carrier frequency following the transmit filters and a corresponding demodulation by the carrier frequency preceding the receive filters. CAP transceivers and QAM transceivers have equivalent performance and may have substantially similar implementations.

FIG. 10A shows a QAM transmitter 1001. Transmit host 1002 outputs a symbol stream to QAM transmitter 1001. The real portion of the sample stream is separated by real extractor 1004 and filtered with upsampling low-pass transmit filter 1006. Upsampling low pass transmit filter 1006 also inserts k-1 null samples between incoming symbols of the received symbol stream. The value of k is the ratio of the sampling rate to the symbol (baud) rate. The output signal from upsampling low-pass transmit filter 1006 is modulated in mixer 1008 by, for example, multiplying it with a $\cos(\omega t)$ function. The imaginary portion of the sample stream is separated by imaginary extractor 1005, filtered in upsampling low-pass transmit filter 1007, and modulated in mixer 1009 with a $\sin(\omega t)$ function. Upsampling low-pass transmit filter 1007 also inserts k-1 null samples between incoming symbols of the received symbol stream. The output signal from mixer 1008 is added to the output signal from mixer 1009 and coupled to transmission channel 1011.

FIG. 10B shows a receiver 1022 coupled to receive signals from transmission channel 1011. The signal from transmission channel 1011 is mixed with a $\cos(\omega t)$ in mixer 1012 and filtered in decimating low-pass receive filter 1014. The signal from transmission channel 1011 is also mixed with a $\sin(\omega t)$ function in mixer 1013 and filtered in decimating low-pass receive filter 1015. Decimating low-pass receive filter 1014 and decimating low-pass receive filter 1015 produce one output sample for every k/L input samples. The combined output signals (i.e., both the real and the imaginary parts of the samples) from decimation low-pass receive filters 1014 and 1015 are received in fractionally spaced equalizer 1017 for equalization. Fractionally spaced equalizer 1017 produces one output sample for every L input samples. Receiver 1022 also includes a decision feedback equalizer (DFE) 1023 for removing the effects of intersymbol interference and other channel distortions from the sample stream. DFE 1023 receives output signals from slicer 1020 and outputs a sample that is a function of past decided upon symbols, which is subtracted from the sample stream in adder 1019. The output sample stream from adder 1019 is received by slicer 1020, which decides on the output symbol stream based on the sample stream from adder 1019.

Frequency-Diverse Single Carrier Modulation

According to the present invention, transceivers such as transceiver 800 (FIG. 8) achieve robust performance over transmission channels with large unusable spectral regions by using a baud rate whose value is less than or equal to half of the spectral bandwidth of the transmitted signal, introducing spectral redundancy. The amount of redundancy increases as the baud rate decreases. Transceivers, therefore, can achieve robust performance over channels with deep wide spectral nulls, such as that shown in FIG. 4, without requiring detailed knowledge by the transmitter of the transmission channel.

In order to better describe embodiments of the invention, the spectral bandwidth of the transmitted signal needs to be precisely defined. Any signal or filter of limited time-duration has infinite bandwidth, so a precise definition of the spectral bandwidth must rely on thresholds. Although other threshold values could have been chosen, it is convenient to choose a threshold of 10 dB below the average power spectral density (PSD) of the passband power spectrum indicating a decrease in PSD of one order of magnitude. A spectral region with a PSD below this threshold is far less useful for carrying information. For any given PSD and baud rate 1/T, the spectral bandwidth can be determined. In this disclosure, the nominal PSD is defined as the maximum average PSD over any contiguous spectral region of bandwidth 1/T, therefore $$PSD_{nom} = \max_{f_c}\left(T\int_{f_c - \frac{1}{2T}}^{f_c + \frac{1}{2T}} S(f)\,df\right),$$

where $\max_x(f(x))$ denotes the maximum value of $f(x)$ over all possible values of x and S(f) is the PSD of the transmitted signal.

The lower band-edge frequency can be defined as the highest frequency below which the PSD is always at least 10 db below the nominal PSD. Likewise, the upper band-edge frequency is the lowest frequency above which the PSD is always at least 10 dB below the nominal PSD. The spectral bandwidth, then, is the upper band-edge frequency minus the lower band-edge frequency. Embodiments of this invention use a baud rate that is less than half the spectral bandwidth of the transmitted signal. Single-carrier modulation schemes that meet this criterion may be considered frequency-diverse.

Figure 11:
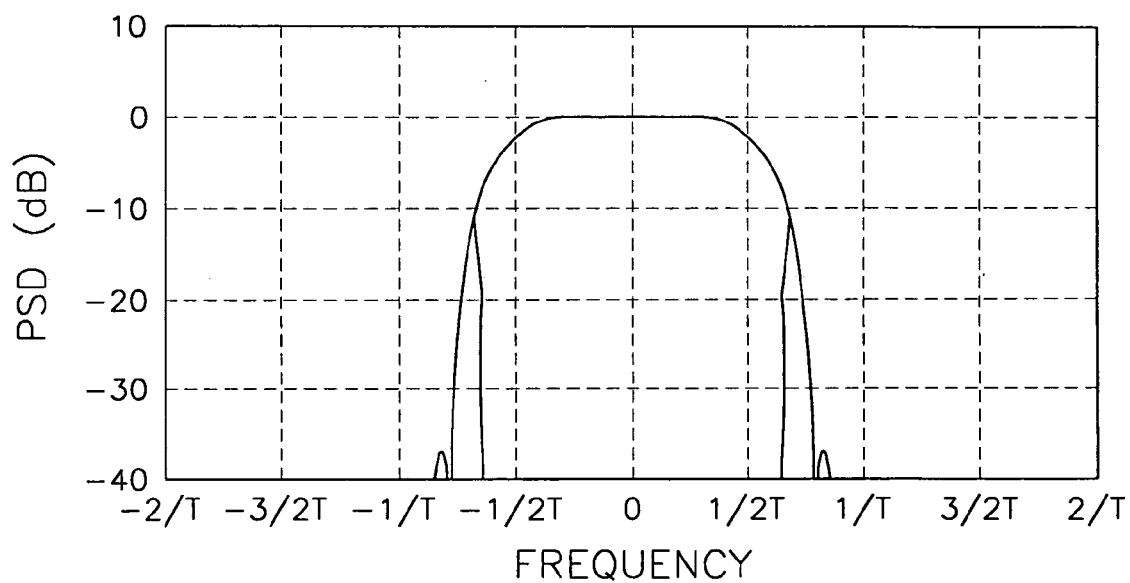
FIG. 11 shows a power spectral density of a 50% excess-bandwidth square-root raised cosine pulse.

FIG. 1 shows a square-root raised cosine pulse, S(f), with 50% excess bandwidth. The graph is normalized such that the nominal PSD of the transmitted signal is 0 dB. The two vertical lines in FIG. 11 indicate the lower band-edge frequency and upper band-edge frequency, as defined above. Clearly, the baud rate 1/T shown in FIG. 11 is not less than half the spectral bandwidth as defined above, so this does not meet the criteria for being frequency diverse. However, this could be made frequency-diverse by decreasing the baud rate such that the criteria is met.

Figure 12A:
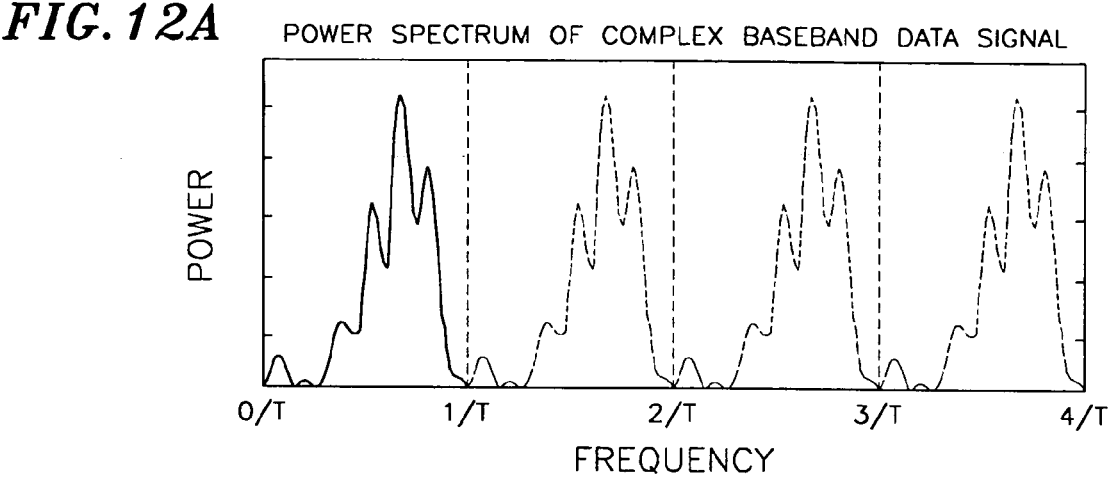
FIGS. 12A through 12C show power spectra of a short complex data burst as it is transmitted through a conventional CAP or QAM transceiver system.
Figure 12B:
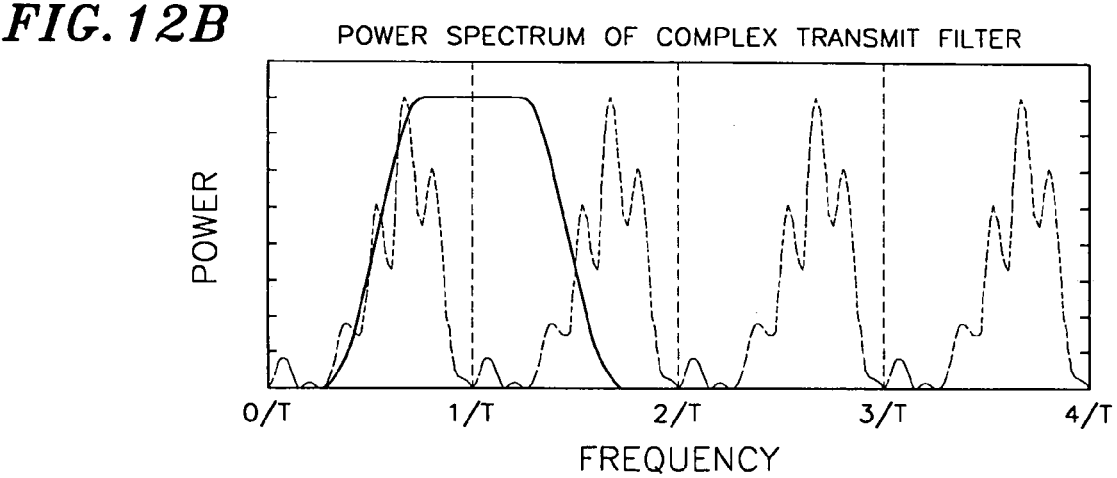
Figure 12C:
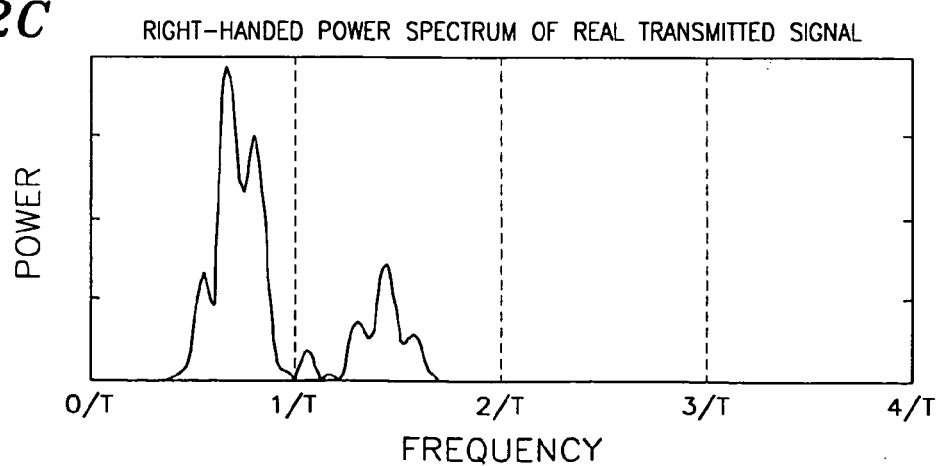

FIGS. 12A–C show spectra of data being sent through a traditional (non-frequency-diverse) CAP transmitter (as illustrated in FIG. 9A) or a QAM transmitter (as illustrated in FIG. 10A) with carrier frequency 1/T. FIG. 12A shows the base-band spectrum for a short complex data sequence at the baud-rate 1/T. The dotted line shows the spectrum of the same signal upsampled with zeros inserted between each symbol, which would occur in upsampling filters 906 and 907 of CAP transmitter 901 (FIG. 9A) or upsampling filters 1006 or 1007 of QAM transmitter 1001 (FIG. 10A). Note that in FIG. 12A the base-band spectrum repeats every 1/T. FIG. 12B shows the power spectrum of the transmit filter (filters 906 and 907 (FIG. 9A) or filters 1006 and 1007 (FIGS. 10A) shifted up in frequency by 1/T. FIG. 12c shows the resulting power spectrum of the signal transmitted from the transmitter.

As is illustrated in FIGS. 12A through 12C, when the data sequence is passed through a transmit filter, most of the redundant spectral information is filtered out. Each spectral region of the base-band signal is sent substantially at only one frequency in the transmitted signal. Using a higher excess bandwidth pulse (e.g. 100%) would provide some spectral redundancy, but not all parts of the spectrum would be repeated at a usable signal level. In contrast to the situation shown in FIGS. 12A–12C, FIGS. 13A–13C illustrate frequency diverse CAP/QAM according to the present invention (transmitter 901 or transmitter 1001, for example). FIG. 13A again shows the base-band power spectral density of a short complex data sequence at a baud rate of 1/T along with the upsampled spectra (represented by dotted lines) that results from upsampling and zero-filling that occurs in transmit filters such as filters 906 and 907 of CAP transmitter 901 (FIG. 9A) or filters 1006 and 1007 of QAM transmitter 1001 (FIG. 10A). FIG. 13B shows the spectral response of the transmit filter. The spectral response of the transmit filter shown in FIG. 13B is identical with the spectral response of the transmit filter shown in FIG. 12B. However, the signal is sampled at twice the rate relative to the baud rate 1/T (or the baud rate 1/T shown in FIGS. 13A through 13B is half the baud rate shown in FIGS. 12A through 12B). FIG. 13C shows the resulting transmittal signal. Each spectral region of the baseband spectrum is transmitted at two different frequencies, creating spectral diversity. Lowering the baud rate 1/T results in further frequency diversity with each spectral region transmitted into frequencies separated by integer multiples of the baud rate. Additionally, increasing the bandwidth of the transmit filters will also increase the frequency diversity. Although the above example has been illustrated with respect to the CAP transmitter of FIG. 9A and the QAM transmitter of FIG. 10A, the invention is applicable to any single-carrier transceiver system.

Conceptually, the benefits of passband single-carrier frequency-diverse modulation are similar to those of traditional frequency-diversity. If part of the frequency band is unusable, resulting in loss of information, it is likely that the same spectral information will be received in a different part of the spectrum, assuming that the typical notch width of any unusable spectral region is less than 1/T. Unlike traditional frequency-diversity, however, this method does not require multiple carrier frequencies in the transmitter or multiple demodulators in the receiver. The signal may be processed optimally with substantially the same receiver structure as a traditional passband CAP or QAM system, such as those shown in FIGS. 9B and 10B, making it ideal for systems in which a non-frequency diverse mode is desired for higher rate operation under better channel conditions. Compared to traditional single-carrier modulation, the obvious penalty of frequency-diverse single carrier modulation is a reduction in symbol rate for a given transmit PSD. However, the achievable bit rate may actually increase under certain channel conditions, as will be shown.

Receiver 812 (FIG. 8) of transceiver 800 processes the full spectral bandwidth of the signal using fractionally spaced equalizer 809, which is capable of combining the different spectral regions in an optimal manner. The coefficients of FSE 809 and DFE 815 may be trained adaptively in order to optimize performance under different channel conditions, and to compensate for the different channel responses between each source-destination pair. Typically, each data transmission can include a known training sequence for training of the equalizers. The equalizers could be trained for optimal performance using any of a number of well-known techniques (See SIMON HAYKIN, ADAPTIVE FILTER THEORY (3rd ed. 1996)). Thus, the benefits of frequency diversity are realized using a single-carrier transceiver structure.

Figure 4:
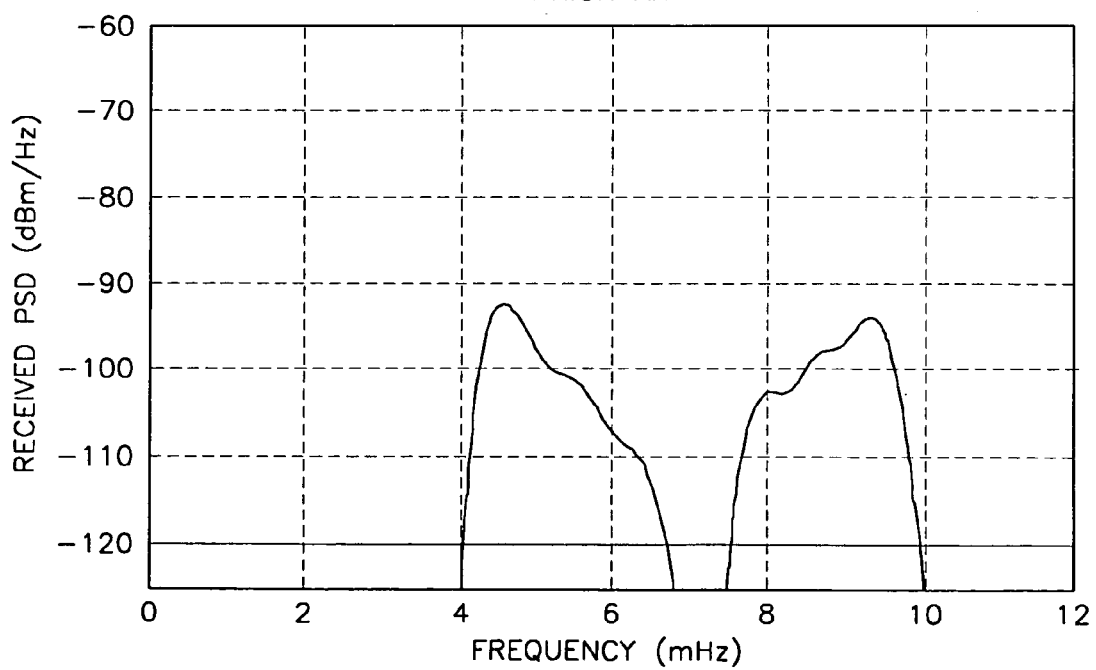
FIG. 4 shows the combined frequency response of the network as shown in FIGS. 1 and 2 and the transmit and receiver filters as shown in FIG. 3.
Figure 5A:
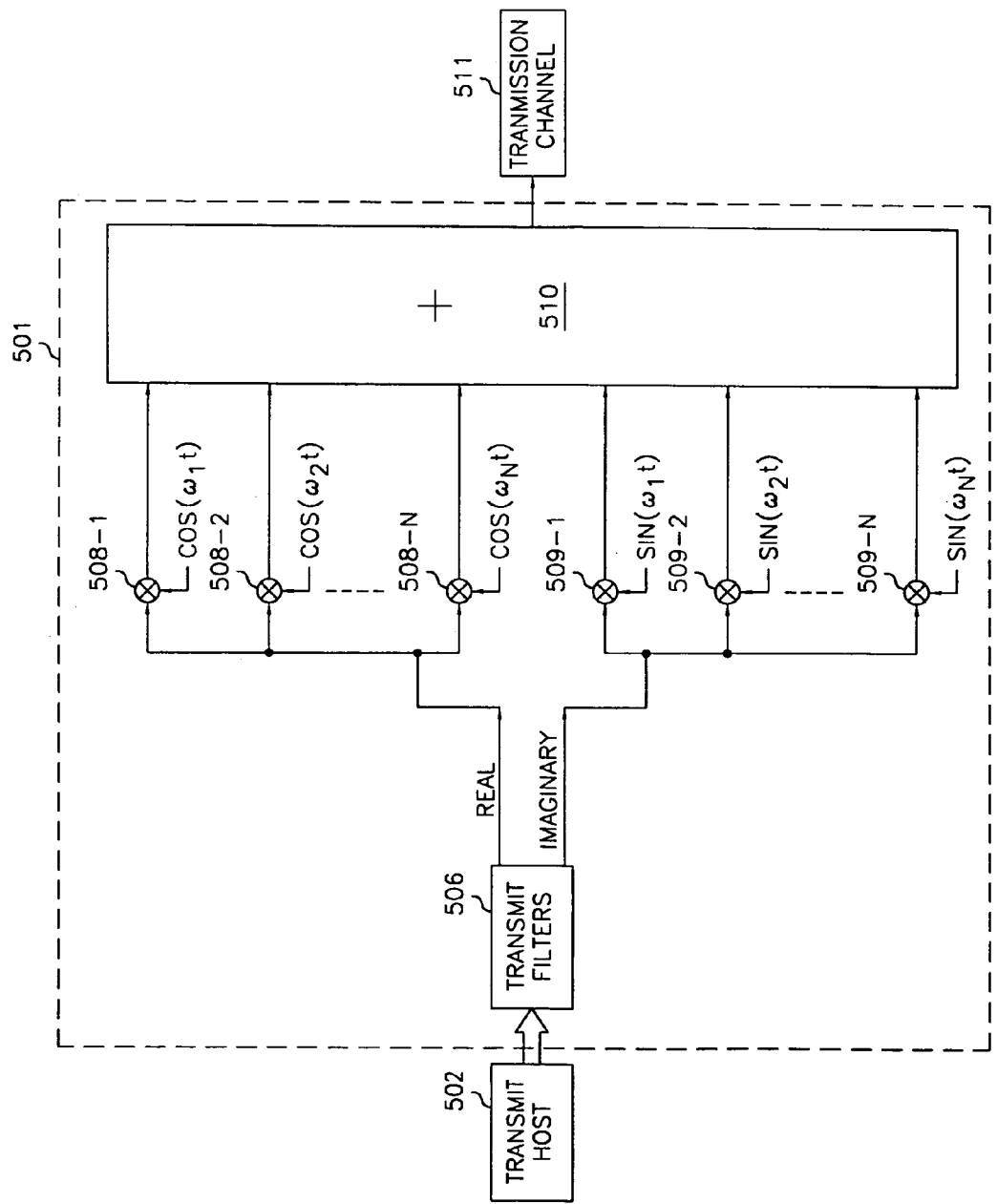
FIG. 5A shows a frequency-diverse QAM transmitter for transmitting a symbol stream using several frequency bands.
Figure 5B:
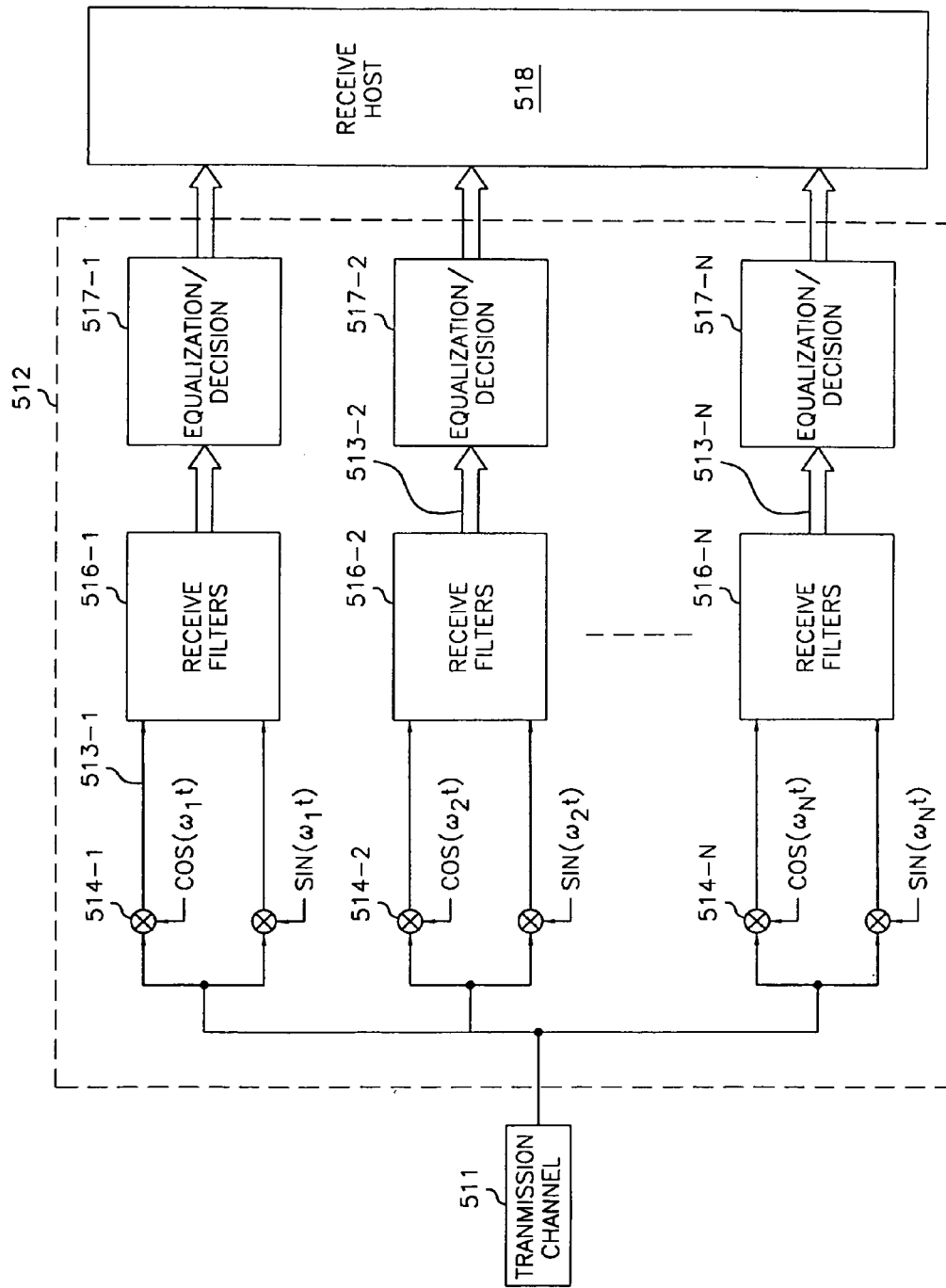
FIG. 5B shows a frequency-diverse QAM receiver for receiving and processing symbols that are transmitted simultaneously over several bands.
Figure 6A:
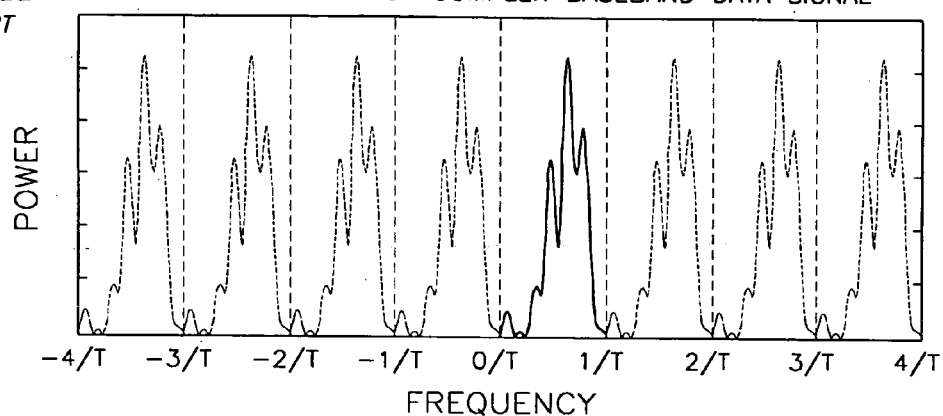
FIGS. 6A, 6B and 6C show power spectra of data transmitted in a frequency diverse system such as that shown in FIGS. 5A and 5B.
Figure 6B:
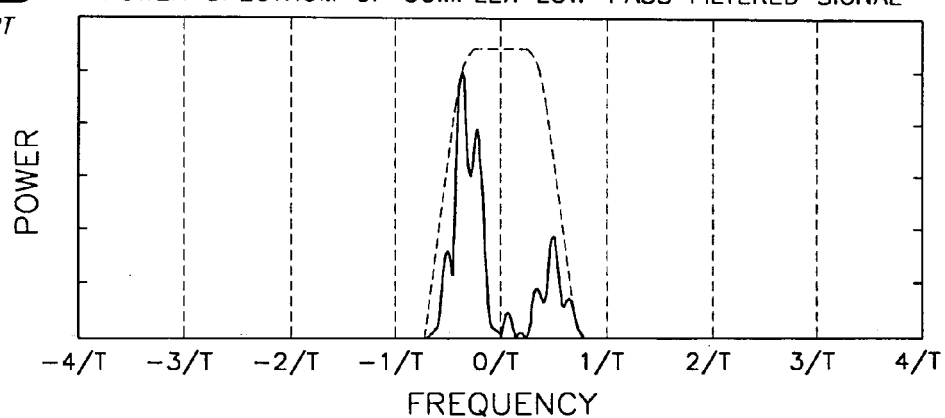
Figure 6C:
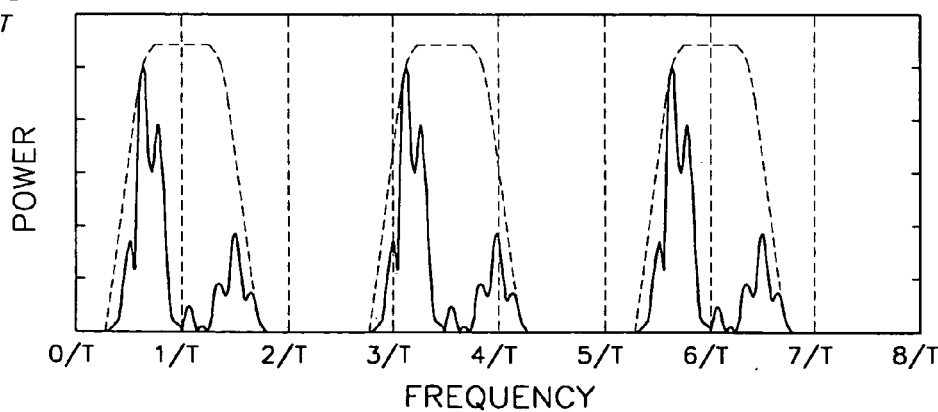
Figure 14:
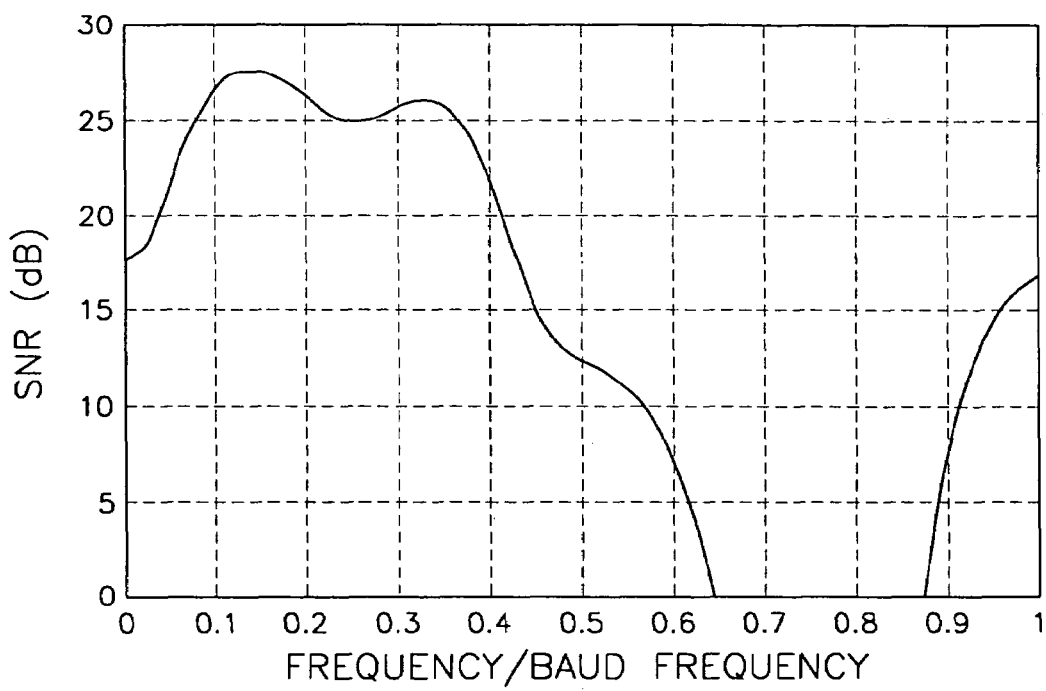
FIG. 14 shows the folded spectrum for the transmission channel of FIG. 4 with a symbol baud rate of 4 MHz.
Figure 15:
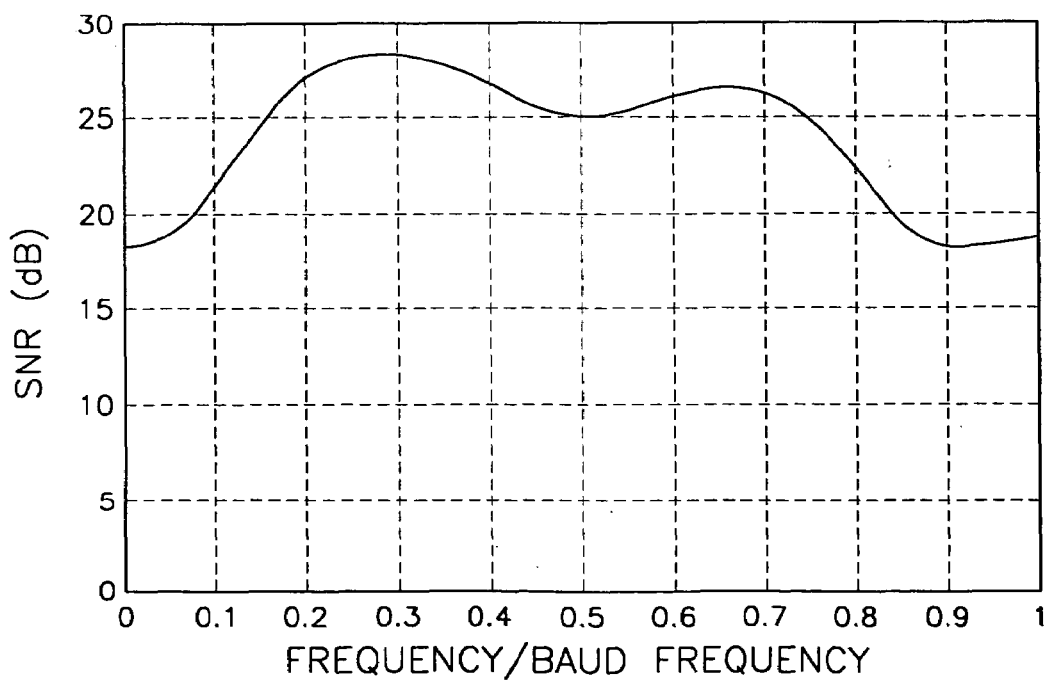
FIG. 15 shows the folded spectrum for the transmission channel shown in FIG. 4 and a symbol baud rate of 2 Mhz.

The benefits of this method are illustrated in the following realistic example. FIG. 4 shows the combined channel response of the example network shown in FIG. 1, with large unusable spectral regions due to RFI filters and reflections from unterminated bridged taps. With a baud rate of 4 Mhz, lower band edge at 4 Mhz and upper band edge at 10 Mhz, this signal is not frequency-diverse as defined above. FIG. 14 shows the folded power spectrum of the channel response shown in FIG. 4 at a baud rate of 4 MHz. (See below for a description of the folded power spectrum and the calculation of the optimal slicer SNR). The folded spectrum shown in FIG. 14 has deep spectral nulls where the spectrum is at or below the noise floor. The optimal slicer SNR is $SNR_{OPT}$=14.7 dB. Assuming a gap of $\Gamma$=15 dB (9 dB coding gap plus 6 dB combined margin and implementation loss), the achievable capacity using integer bits per symbol is zero, so no data can be reliably transmitted. However, at a baud rate of 2 Mhz, using the same transmitted PSD, the transmitted signal is frequency diverse, and reliable operation is possible. FIG. 15 shows the folded power spectrum of the channel response shown in FIG. 4 for a baud rate of 2 Mhz. The folded power spectrum contains no spectral nulls and the optimal slicer SNR is $SNR_{OPT}$=23.9 dB. Again, assuming a gap of $\Gamma$=15 dB, the resulting achievable capacity is 3 bits per symbol or 6 Mbps. The folded spectra shown in FIGS. 14 and 15 is achieved by transceiver 800 shown in FIG. 8 by selecting baud rates of 4 Mhz and 2 Mhz, respectively, and setting L=2 and L=4, respectively with k=8 and k=16, respectively.

Accordingly, frequency-diverse single-carrier passband modulation in accordance with one embodiment of the present invention enables robust operation on channels too severe for full baud-rate single-carrier modulation (e.g., due to deep spectral notches and low SNR) and is less complex than traditional frequency-diverse modulation. Moreover, using frequency-diverse single-carrier passband modulation, all adaptation (other than rate adaptation) can occur at receiver 812, unlike multicarrier modulation. Use of a frequency-diverse single-carrier passband modulation scheme can increase the usable SNR range several dB over traditional full-baud rate single-carrier modulation.

In one embodiment of the invention, the baud rate and the value of L for the fractionally spaced equalizer of the receiver are fixed. In other embodiments, the baud rate is adaptively chosen to maximize the error-free throughput of the channel. In these embodiments, the baud rate is communicated between the transmitter and the receiver by a parallel transceiver system. Typically, the same transmit filter is used for the different baud rates, so the amount of spectral redundancy increases as the baud rate decreases. In one embodiment of the adaptively chosen system, the transceiver starts at a minimum baud rate and then moves to faster baud rates if the transmission channel permits. In some embodiments, the transceiver can test several baud rates before an acceptable baud rate is chosen. In another embodiment of the adaptively chosen system, the transceiver can default to use of the maximum available baud rate and resorts to baud rates of less than half the spectral bandwidth of the transmitted signal in situations where the bit error rate becomes excessive.

In one embodiment of the invention, critical control information and other high priority error-sensitive data are sent at a low baud rate while less error sensitive data is sent at a high baud rate. Reliable transmission of critical data can be obtained while allowing a higher baud rate for less sensitive data.

Theoretical and Achievable Channel Capacity

The theoretical channel capacity is the theoretical limit on the rate that data can be transmitted error-free across a channel. See J. M. Cioffi, et al., *MMSE Decision-Feedback Equalizers and Coding—Part I: Equalization Results and Part II: Coding Results*, IEEE TRANS. COMM., vol. 43, no. 10, p. 2582–2604, October 1995.

Figure 3:
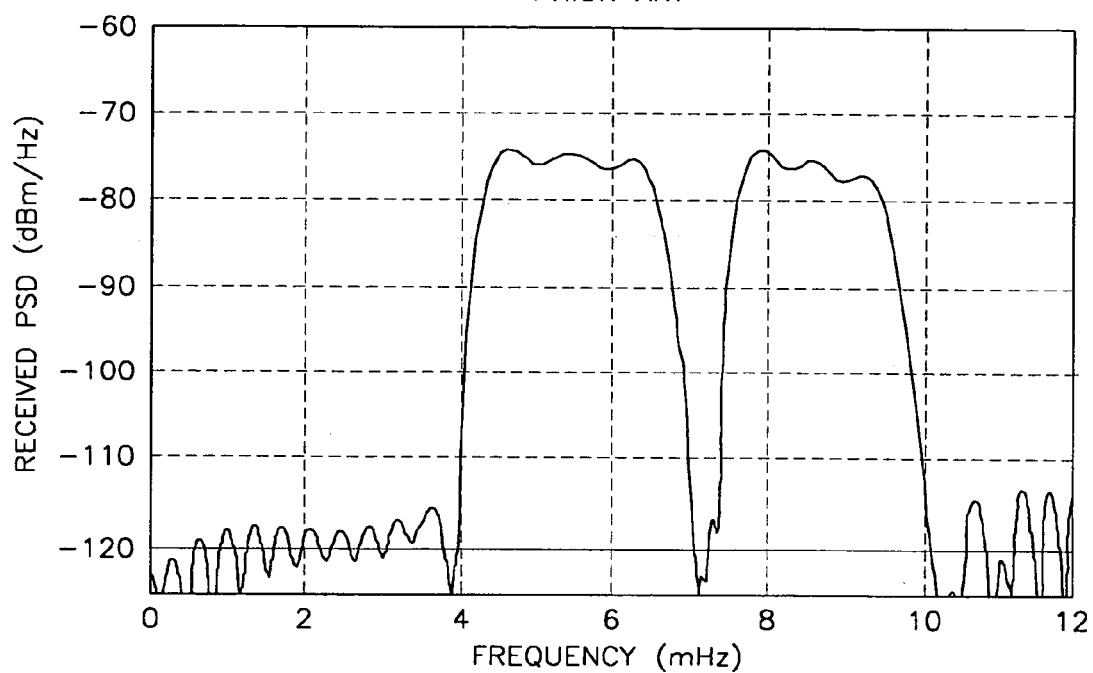
FIG. 3 shows the combined frequency response of the transmit and receive filters, including radio-frequency interference (RFI) suppression filters, for a transmission band between 4 and 10 Mhz.

For a single-carrier modulation scheme at a given baud rate, the theoretical channel capacity can be calculated as follows. The folded power spectrum is defined as $$|S_{hh}(\theta)|^2 \equiv \frac{1}{T} \sum_m \left| F\left(\frac{\theta + 2\pi m}{2\pi T}\right) \right|^2, \tag{A2}$$

where T is the symbol period (i.e., 1/T is the symbol baud rate), F(f) is the combined response of the transmit filters, the transmission channel, and any fixed receiver filters (see, e.g., FIG. 3), $\theta$ is the normalized baseband frequency (between $-\pi$ and $\pi$), and m is all possible integers. (See Cioffi, Part I). The theoretical capacity (in bits per symbol) is then given by:

$$C(T) = \frac{1}{2\pi} \int_{-\pi}^{\pi} \log_2\left(1 + \frac{S_x}{N_0}|S_{hh}(\theta)|^2\right) d\theta, \tag{A3}$$

where $S_x$ is the average signal power at the input terminal of the transmit filter (see transmit filter 804 of FIG. 8) and $N_0$ is the double-sided power spectral density of the noise at the output terminal of the combined filter F(f), assumed to be white noise. It is also useful to define the signal-to-noise ratio at the slicer (see slicer 811 of FIG. 8) of an optimal receiver structure as $$SNR_{OPT}(T) \equiv 2^{C(T)} - 1. \tag{A4}$$

From Equation A4, it is apparent that $$C(T) = \log_2(SNR_{OPT} + 1). \tag{A5}$$

The theoretical channel capacity C(T)/T (in bits per second) increases monotonically with the baud rate 1/T.

The theoretical channel capacity C(T) is an upper limit on the throughput that any transceiver can achieve with a symbol rate of 1/T. Achieving this theoretical limit, however, would require infinitely complex coding schemes. The achievable capacity of an actual modem can be given by the gap approximation:

$$C^{\Gamma}(T) = \log_2\left(1 + \frac{SNR_{OPT}}{\Gamma}\right), \tag{A6}$$

where $\Gamma$ is the gap, which depends on the coding scheme and the desired bit error rate. For an ideal modem using an uncoded square constellation with a desired bit error rate of $1e^{-6}$, $\Gamma$ is approximately 9 dB. The capacity of a practical modem, however, will be lower due to equalizer misadjustment, timing misadjustment, and other sources of implementation loss. In addition, some additional margin may be needed to accommodate time-varying noise events. Thus, for a practical modem, $\Gamma$ may be around 15 dB.

Furthermore, to simplify the implementation of a transceiver, it is often desirable to use an integer number of bits per symbol. Subject to this constraint, the achievable capacity can be written as $$C_{int}^{\Gamma} = \left\lfloor \log_2\left(1 + \frac{SNR_{OPT}}{\Gamma}\right) \right\rfloor, \quad (A7)$$

where the floor brackets represent rounding down to the nearest lower integer. It is important to note that while the theoretical capacity, in bits per second, increases monotonically with the baud rate 1/T, the achievable capacity does not. On a severely distorted channel, reducing the baud rate may increase the achievable capacity.

FIG. 16 shows an example of the channel capacity versus achievable channel capacities for uncoded CAP modulation schemes (assuming a bit error rate of $10^{-6}$). The theoretical capacity, the achievable capacity (assuming a 9 dB gap) and the achievable capacity (having a 15 dB gap, including implementation loss and margin) is shown. As is seen from FIG. 16, with a 9 dB gap, 4-CAP (2 bits per symbol) modulation requires a SNR of 13.5 dB, 16-CAP (4 bits per symbol) modulation requires a SNR of 20.5 dB, and 64-CAP (6 bits per symbol) modulation requires a SNR of 26.8 dB. Achievable transmission capacities with a 15 dB gap (including margin) require a SNR of 19.5 dB for 4-CAP modulation, a SNR of 26.5 dB for 16-CAP modulation, and a SNR of 32.8 dB for 64-CAP modulation.

Although particular embodiments of the present invention have been shown and described, it will be apparent to those skilled in the art that changes and modifications can be made without departing from the present invention in its broader aspects. Therefore, the invention is limited only by the following claims.

The invention claimed is:

1. A receiver comprising:
a mixer having an input that is operable to receive a frequency diverse signal that carries at least two spectral copies of a baseband signal and to mix the frequency diverse signal with a local oscillation to produce a down converted signal that includes the at least two spectral copies of the baseband signal;
a decimating filter communicatively coupled to the mixer and operable to receive the down converted signal and to decimate and filter the down converted signal to produce a combined baseband signal, wherein the combined baseband signal includes information from each of the at least two spectral copies of the baseband signal; and
a data extractor communicatively coupled to the decimating filter and operable to receive the combined baseband signal and to extract data from the combined baseband signal.

2. The receiver of claim 1, wherein the data extractor comprises a decision feedback equalizer.

3. The receiver of claim 1, wherein:
the mixer includes an in-phase mixer component that is operable to produce an in-phase component of the down converted signal and a quadrature mixer component that is operable to produce a quadrature component of the down converted signal;
the decimating filter includes:
an in-phase decimating filter component that is operable to receive the in-phase component of the down converted signal and to produce an in-phase component of the combined baseband signal; and
a quadrature decimating filter component that is operable to receive the quadrature component of the down converted signal and to produce a quadrature component of the combined baseband signal; and
further comprising a combiner communicatively coupled between the decimating filter and the data extractor that is operable to receive the in-phase component of the combined baseband signal and the quadrature component of the combined baseband signal and to combine the in-phase component of the combined baseband signal with the quadrature component of the combined baseband signal to produce the combined baseband signal.

4. The receiver of claim 1, wherein the frequency diverse signal is one of a Quadrature Amplitude (QAM) Modulated signal, a Carrierless Amplitude-Phase (CAP) modulated signal, a Phase Shift Keying (PSK) modulated signal, and an Amplitude Phase Shift Keying (APSK) modulated signal.

5. The receiver of claim 1, wherein the receiver forms a portion of wired Local Area Network (LAN) transceiver.

6. The receiver of claim 1, wherein the receiver forms a portion of home phone line network transceiver.

7. A receiver comprising:
an input that is operable to receive a frequency diverse signal, wherein the frequency diverse input includes at least two spectral copies of a baseband signal;
a decimating receive filter communicatively coupled to the input and operable to receive the frequency diverse signal and to decimate and filter the frequency diverse signal to produce a combined baseband signal, wherein the combined baseband signal includes information from each of the at least two spectral copies of the baseband signal; and
a data extractor communicatively coupled to the decimating receive filter and operable to receive the combined baseband signal and to extract data from the combined baseband signal.

8. The receiver of claim 7, wherein the data extractor comprises a decision feedback equalizer.

9. The receiver of claim 7, wherein:
the decimating receive filter includes an in-phase component that is operable to produce an in-phase portion of the combined baseband signal and a quadrature component that is operable to produce a quadrature portion of the combined baseband signal; and
further comprising a combiner communicatively coupled between the decimating receive filter and the data extractor that is operable to receive the in-phase component of the combined baseband signal and the quadrature component of the combined baseband signal, wherein the combiner is operable to combine the in-phase component of the combined baseband signal and the quadrature component of the combined baseband signal to produce the combined baseband signal.

10. The receiver of claim 7, wherein the frequency diverse signal is one of a Quadrature Amplitude (QAM) Modulated signal, a Carrierless Amplitude-Phase (CAP) modulated signal, a Phase Shift Keying (PSK) modulated signal, and an Amplitude Phase Shift Keying (APSK) modulated signal.

11. The receiver of claim 7, wherein the receiver forms a portion of wired Local Area Network (LAN) transceiver.

12. The receiver of claim 7, wherein the receiver forms a portion of home phone line network transceiver.

* * * * *